Patented Nov. 8, 1927.

1,648,852

UNITED STATES PATENT OFFICE.

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY.

SYNTHETIC RESINOUS PRODUCT AND PROCESS OF MAKING SAME.

No Drawing.   Application filed October 23, 1924.  Serial No. 745,386.

This invention relates to a synthetic resinous product and to the process of making same and relates especially to resinous material obtained by reacting on a dyestuff with an aldehyde such as formaldehyde.

The dyestuff which I employ is prepared by reacting on benzotrichloride or side-chain chlorinated toluol with a phenolic body such as commercial carbolic acid or ordinary phenol, also tar acids, cresylic acid, ortho, meta and para cresols, xylenols etc. The proportion of the chlorinated material and the phenol may be varied somewhat but preferably I employ a proportion represented by 1 mol. of benzotrichloride to 3 mols. of the phenolic body. In any event I prefer to not employ any excess of the phenol as I wish to have no free phenolic body present in the finished dyestuff.

The reaction with the lower phenols takes place very vigorously. For example in heating in a flask under reflux condenser a mixture of carbolic acid and benzotrichloride in the above proportions the reaction may start so vigorously that the contents of the flask will be projected through the condenser. This is probably due to the very rapid evolution of hydrochloric acid. The reaction takes place in a more quiet manner in the case of for example orthocresol. On gently warming an orthocresol mixture reaction starts and the source of heat then may be removed. The reaction goes on spontaneously with the evolution of heat until a considerable proportion of the chlorine has been expelled as hydrochloric acid. Heat then may be applied and the remainder of the chlorine present in the side-chain practically completely expelled as hydrochloric acid.

The reaction carried out in these proportions or in approximately these proportions yields a somewhat reddish dyestuff usually in the form of a thick syrup or what may be termed a semi-liquid. Unlike the corrosive carbolic acid which for example may have been used in making the dyestuff the resulting material when freed from hydrochloric acid is not of a corrosive acid character but is totally distinct and different from either of the raw materials employed. Both the benzotrichloride and the carbolic acid are very vicious caustic and dangerous substances but when brought together the virulence of each is destroyed by attack on the other and a mild neutral non-phenolic substance results which I have found from working with it extensively has no corrosive action on the skin of my hands even though it remains thereon for hours at a time. It is true that the dyestuff has a staining action but it is not caustic like carbolic acid or the cresols. Any of these latter substances placed on the skin of the hands will burn producing a white seared spot in a very short time.

The dyestuff has the property of reacting with aldehydes particularly formaldehyde to produce a hard resin even though the formaldehyde is used in very small proportion. I call attention to this noteworthy fact because in making resins from phenol and formaldehyde in the usual way a large proportion of formaldehyde is required. In producing resins from urea a very substantial amount of formaldehyde is called for. The same is true of resins prepared by the reaction of formaldehyde on acetone, aniline and other substances. Formaldehyde is a well known resinifying agent but it is generally understood in the synthetic resin industry that a large proportion of it must be used to secure a suitable resin. Also since formaldehyde frequently is the most expensive constituent the use of so large a proportion of formaldehyde considerably increases the cost of manufacture.

However since only a few per cent of actual formaldehyde suffices in the case of the present invention to yield a resin of useful qualities I am not put to the expense necessitated in producing the more costly products now industrially made from phenol and formaldehyde, urea and formaldehyde and the like.

A further feature is the fact that formaldehyde fluctuates a good bit in price whereas chlorine is more stable in this respect and side-chain chlorinated toluol can be readily prepared from materials which are most abundant.

The dyestuff which as indicated does not respond to the usual tests for phenol shows various dissimilarities with respect to phenol. Although phenol and chlorinated toluol are used in the preparation the product chemically and physically is strikingly different from either of these raw materials. While a relatively small or even minute amount of formaldehyde suffices to turn the dyestuff into a resin, a slightly larger proportion yields a resin which like those prepared from urea and other substances have the property of hardening on heating. This is advantageous in molding plastic material because the hardening may take place in a hot press and by such setting the molded article may be removed and handled while still hot.

The striking feature about my dyestuff resin is that it will become converted into a heat-setting or thermo-rigid body without the employment of the inordinate amounts of formaldehyde or hexamethylenetetramine, or mixtures of the two, now employed in the case of the phenol-formaldehyde resins, the urea-formaldehyde resins, the acetone-formaldehyde resins and others. I am therefore of the opinion that the dyestuffs has a molecular structure or composition radically different from any resinous substance heretofore proposed for use in the plastic molding industry.

As examples of methods of preparation of the dyestuff resin the following are given:

*Example 1.*—56.4 parts by weight of carbolic acid and 41 parts of side-chain chlorinated toluol (specific gravity 1.34) were mixed and upon gentle heating an exothermic reaction took place and hydrogen chloride was evolved. Upon completion of the exothermic reaction the resulting solution was heated to boiling for 2 hours under reflux condenser. During the first hour of the heating hydrogen chloride continued to be evolved. A dyestuff of a somewhat reddish color, as a syrupy substance was obtained. Toward the end of the boiling water was given off as evidenced by a spitting and crackling in the reaction vessel. A dark red brown semi-liquid product was obtained, the yield of this product being up to about 155 per cent of the carbolic acid taken. This product was steam distilled to free it from a small quantity of free carbolic acid still present, the loss being 2 per cent. After this treatment the product obtained is a tough semi-solid, soluble in organic solvents such as alcohol, acetone and benzol. Its properties resemble those of a dye belonging to the oxycarboquinonic series such as the derivatives of the triphenylmethane group. Upon prolonged heating at an elevated temperature it gradually hardens into an infusible, insoluble brittle resinous body. The product after steam distillation was then boiled with 25 per cent of its weight of aqueous 40 per cent formaldehyde solution (i. e. 10% of actual formaldehyde, in solution. based on the weight of the intermediate or dyestuff) under a reflux condenser for 1 hour. During the boiling the solution separated into two layers, the lower layer being a dark viscous mass when hot which hardened upon cooling to a lustrous dark somewhat tacky resin having a melting point of between 40 and 50° C. The resin obtained is soluble in organic solvents such as alcohol, acetone, benzol and the like.

A molding composition was prepared using the above resin by dissolving the resin in an equal quantity of alcohol and 10 per cent hexamethylenetetramine was subsequently dissolved in the alcohol solution. A quantity of wood flour equal in weight to that of the resin was impregnated with the alcoholic solution and the composition was then dried in a vacuum dryer. Upon submitting the composition to a hot molding operation a thermo-rigid molded article was obtained which exhibited all the desirable properties required of a commercial molding composition such as flowability, finish etc. A molded article prepared from this composition when compared with a molded article prepared with a phenol-formaldehyde condensation product was found to have one to one and a half times the transverse strength of that of a phenol-formaldehyde resin.

*Example 2.*—158 parts of orthocresol after mixing with 100 parts of chlorinated toluol was placed in a reaction vessel fitted with a reflux condenser and gently heated. An exothermic reaction took place with the evolution of hydrogen chloride and the temperature of the mixture rose due to the heat of reaction to 60–70° C. Heat was then applied and the solution boiled for 1½ to 2 hours. When the temperature of the solution reached 205° C. separation of water occurred as shown by the spitting and crackling taking place in the reaction vessel and also by the condensate running back from the reflux. The product obtained is a dark reddish brown viscous semi-solid, soluble in organic solvents such as alcohol, acetone, benzol and the like. On heating this product for a prolonged period of time at a temperature of 150–200° C. it gradually became more viscous but did not solidify to a thermo-rigid body. The product after steam distillation to remove any free cresol present was boiled with 25 per cent of its weight of 40 per cent formaldehyde solution under reflux for one hour. A dark hard brittle lustrous fusible resin was obtained, soluble in organic solvents such as alcohol, benzol, acetone and the like. Upon treatment of the fusible resin with 10 per cent of its weight of hexamethylenetetramine an insoluble but still fusible resinous product was obtained.

What I claim is:—

1. The process of reacting on a corrosive phenol with benzotrichloride to form a substantially non-corrosive dyestuff-containing material, steam distilling this product and resinifying the latter with an amount of formaldehyde equal to not substantially above one tenth of the weight of said dyestuff-containing material.

2. The process of reacting on a phenol with side-chain-chlorinated toluol to form a substantially non-corrosive dyestuff-containing material, steam distilling this product and resinifying the latter with an amount of formaldehyde equal to not substantially above one tenth of the weight of said dyestuff-containing material.

3. The process which comprises reacting with benzotrichloride approximately one mol. on carbolic acid approximately three mols. to form a substantially non-corrosive red dyestuff, steam distilling to remove any unchanged carbolic acid, heating to increase the consistency, resinifying by treatment with aqueous formaldehyde in the presence of an acid substance, purifying the resulting resin and incorporating with it a small proportion of hexamethylenetetramine.

4. A process which comprises reacting upon a phenol with side-chain-chlorinated toluol, to form a substantially non-corrosive dyestuff-containing material, removing excess of the phenol by steam distillation and reacting upon the dye-containing material with a small amount of formaldehyde.

5. A process which comprises reacting upon a phenol with benzotrichloride to form a substantially non-corrosive dyestuff-containing material, removing excess of the phenol by steam distillation and reacting upon the dye-containing material with a small amount of formaldehyde.

6. A process which comprises reacting upon a phenol with side-chain-chlorinated toluol, to form a substantially non-corrosive dyestuff-containing material, removing excess of the phenol and reacting upon the dyestuff-containing material with a small amount of formaldehyde.

7. A process which comprises reacting upon a phenol with benzotrichloride to form a substantially non-corrosive dyestuff-containing material, removing excess of the phenol and reacting upon the dyestuff-containing material with a small amount of formaldehyde.

BORIS N. LOUGOVOY.